United States Patent
Hong

(10) Patent No.: US 7,810,120 B2
(45) Date of Patent: Oct. 5, 2010

(54) METHOD AND APPARATUS FOR MANAGING A LIST OF RECORDED BROADCASTING PROGRAMS

(75) Inventor: Joo-sun Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1319 days.

(21) Appl. No.: 10/455,818

(22) Filed: Jun. 6, 2003

(65) Prior Publication Data

US 2004/0078818 A1 Apr. 22, 2004

(30) Foreign Application Priority Data

Oct. 18, 2002 (KR) .................. 10-2002-0063846

(51) Int. Cl.
*H04N 7/10* (2006.01)
(52) U.S. Cl. .................. 725/58; 725/52; 725/44
(58) Field of Classification Search .................. 725/58, 725/52, 44
See application file for complete search history.

(56) References Cited

U.S. PATENT DOCUMENTS

| | | | |
|---|---|---|---|
| 6,157,772 A * | 12/2000 | Kim | 386/83 |
| 6,671,454 B1 * | 12/2003 | Kaneko et al. | 386/83 |
| 6,920,641 B1 * | 7/2005 | Hanai et al. | 725/142 |
| 6,930,641 B2 * | 8/2005 | Ohara et al. | 343/702 |
| 7,046,913 B1 * | 5/2006 | Sato | 386/83 |
| 2002/0054068 A1 * | 5/2002 | Ellis et al. | 345/716 |
| 2002/0056102 A1 * | 5/2002 | Dillon et al. | 725/39 |
| 2007/0006266 A1 * | 1/2007 | Yamamoto | 725/46 |

* cited by examiner

*Primary Examiner*—Christopher Kelley
*Assistant Examiner*—Franklin S Andramuno
(74) *Attorney, Agent, or Firm*—Sughrue Mion, PLLC

(57) ABSTRACT

A method and apparatus to manage recorded broadcasting programs, in which a list of each of the recorded programs is automatically generated using electronic program guide (EPG) information for more efficient management of the recorded programs. The method includes: (a) detecting information on a starting time and an ending time for recording when a recording mode is enabled; (b) extracting information on programs included between the starting time and the ending time, respectively, from electronic program guide (EPG) information, and (c) storing the information extracted in step (b) in a file allocation table (FAT) to be matched with information on recording time and locations of corresponding programs recorded in a recording unit.

8 Claims, 3 Drawing Sheets

FIG. 3

| | TITLE | RECORDED TIME |
|---|---|---|
| 1 | PROGRAM 1 | 100 MINUTES |
| 2 | PROGRAM 2 | 30 MINUTES |
| 3 | PROGRAM 3 | 30 MINUTES |
| 4 | PROGRAM 4 | 30 MINUTES |
| 5 | PROGRAM 5 | 30 MINUTES |
| ⋮ | ⋮ | ⋮ |

RECORDABLE TIME: 0000  DETAILED LIST

△ MOVE ▽ SELECT PLAY DELECTE END

FIG. 4

RECORDABLE TIME 2002.08.09 13:00  PLAY ALL

| TIME | TITLE | RECORDED TIME |
|---|---|---|
| 0-10 MINUTES | PROGRAM a | 10 MINUTES |
| 10-30 MINUTES | PROGRAM b | 20 MINUTES |
| 30-40 MINUTES | PROGRAM c | 10 MINUTES |
| 40-50 MINUTES | PROGRAM d | 10 MINUTES |
| 50-80 MINUTES | PROGRAM e | 30 MINUTES |
| 80-100 MINUTES | PROGRAM f | 20 MINUTES |

△ MOVE ▽ SELECT PLAY DELETE END

METHOD AND APPARATUS FOR MANAGING A LIST OF RECORDED BROADCASTING PROGRAMS

This application claims the priority of Korean Patent Application No. 2002-63846, filed on Oct. 18, 2002, in the Korean Intellectual Property Office, the disclosure of which is incorporated herein in its entirety by reference.

BACKGROUND OF THE INVENTION

1. Field of the Invention

The present invention relates to a method and apparatus for recording a television (TV) broadcasting program, and more particularly, to a method and apparatus for automatically generating and managing a list of broadcasting programs recorded on a recording unit.

2. Description of the Related Art

As data processing technologies are particularly developing in the field of televisions, broadcasting stations are becoming able to transmit various kinds of additional information, including general information on TV programs, together with video and audio signals, and users can receive through TV receivers and utilize such additional information for many purposes.

In other words, typical analog broadcasting systems have transmitted a very limited amount of additional information. Thus, it has not been possible to provide users with various services because there is a limit to the additional information that can be inserted and transmitted in predetermined intervals of horizontal synchronization signals. However, recently developed digital broadcasting systems can massively transmit additional information for users' conveniences. Such additional information includes not only electronic program guide (EPG) information including general information on TV programs but also information regarding education, games, on-line commercial transactions, etc., and the coverage of the additional information is inclined to increase.

In addition, the range of functions of a digital TV receiver is likely inclined to increase from a basic function for processing the broadcasting signals and outputting them through a display device to a function for recording broadcasting programs on a recording unit, such as a hard disc drive (HDD), incorporated in the digital TV receiver in accordance with a user's preferences.

Usually, a list of recorded broadcasting programs is stored in a file allocation table (FAT) of a HDD for efficient management thereof. However, in a conventional method of managing the list of recorded broadcasting programs, title information of only a starting program, i.e., a broadcasting program that corresponds to the starting time of recording, has been extracted from EPG information and stored in the FAT, together with track information and information on the recording time. That is, in a case where two or more programs are recorded at one time in the same file, only the starting program can be managed since only the title information of the starting program is stored in the FAT. Thus, it is hard to know and impossible to access directly each of the other programs recorded in the same file as the starting program. As well, many inconveniences in managing the recorded programs exist.

SUMMARY OF THE INVENTION

The present invention provides a method and apparatus for managing recorded broadcasting programs, in which a list of each of the recorded programs is automatically generated using electronic program guide (EPG) information for more efficient management of the recorded programs.

According to an aspect of the present invention, there is provided a method of managing a list of recorded broadcasting programs, which includes the steps of (a) detecting information on a starting time and an ending time of recording when a recording mode is enabled; (b) extracting information on programs included between the starting time and the ending time, respectively, from electronic program guide (EPG) information, and (c) storing the information extracted in step (b) in a file allocation table (FAT) to be matched with information on the recording time periods and locations of corresponding programs recorded in a recording unit.

According to another aspect of the present invention, there is provided an apparatus for managing a list of recorded broadcasting programs, which includes a broadcasting signal receiving unit for selecting and demodulating only such broadcasting signals that correspond to a selected channel from received broadcasting signals in accordance with a channel control signal; a memory for storing electronic program guide (EPG) information separated from the broadcasting signals received through the broadcasting signal receiving unit; a recording unit for storing a broadcasting program selected in a recording mode; and a controller for implementing control processes of extracting information on programs included between the starting time and the ending time, respectively, from the EPG information, and storing the extracted information in a file allocation table (FAT) to be matched with information on the recording time periods and locations of corresponding programs recorded in the recording unit.

BRIEF DESCRIPTION OF THE DRAWINGS

The above and other aspects and advantages of the present invention will become more apparent by describing in detail preferred embodiments thereof with reference to the attached drawings in which:

FIG. 3 is a schematic diagram of an example of an upper level menu displaying a list of recorded broadcasting programs according to the present invention; and FIG. 4 is a schematic diagram of an example of a lower level menu displaying a detailed list of sub programs recorded in connection with a main program according to the present invention.

DETAILED DESCRIPTION OF THE INVENTION

In a digital broadcasting system, audio and video data streams are compressed in a format of digital information data, and system and program information are compressed in accordance with a program and system information protocol (PSIP). Information other than audio and video data information, e.g., information regarding a broadcasting program, is decoded and displayed on a screen as electronic program guide (EPG) information via an adequate graphic signal processing procedure.

The PSIP is an ATSC standard for digital broadcasting using ground waves or through cables, in which standards for program information and system information are defined. More specifically, the PSIP defines a method of providing various kinds of information on broadcasting programs by parsing broadcasting signals encoded in accordance with an MPEG (Moving Picture Experts Group) standard.

Figure 1:
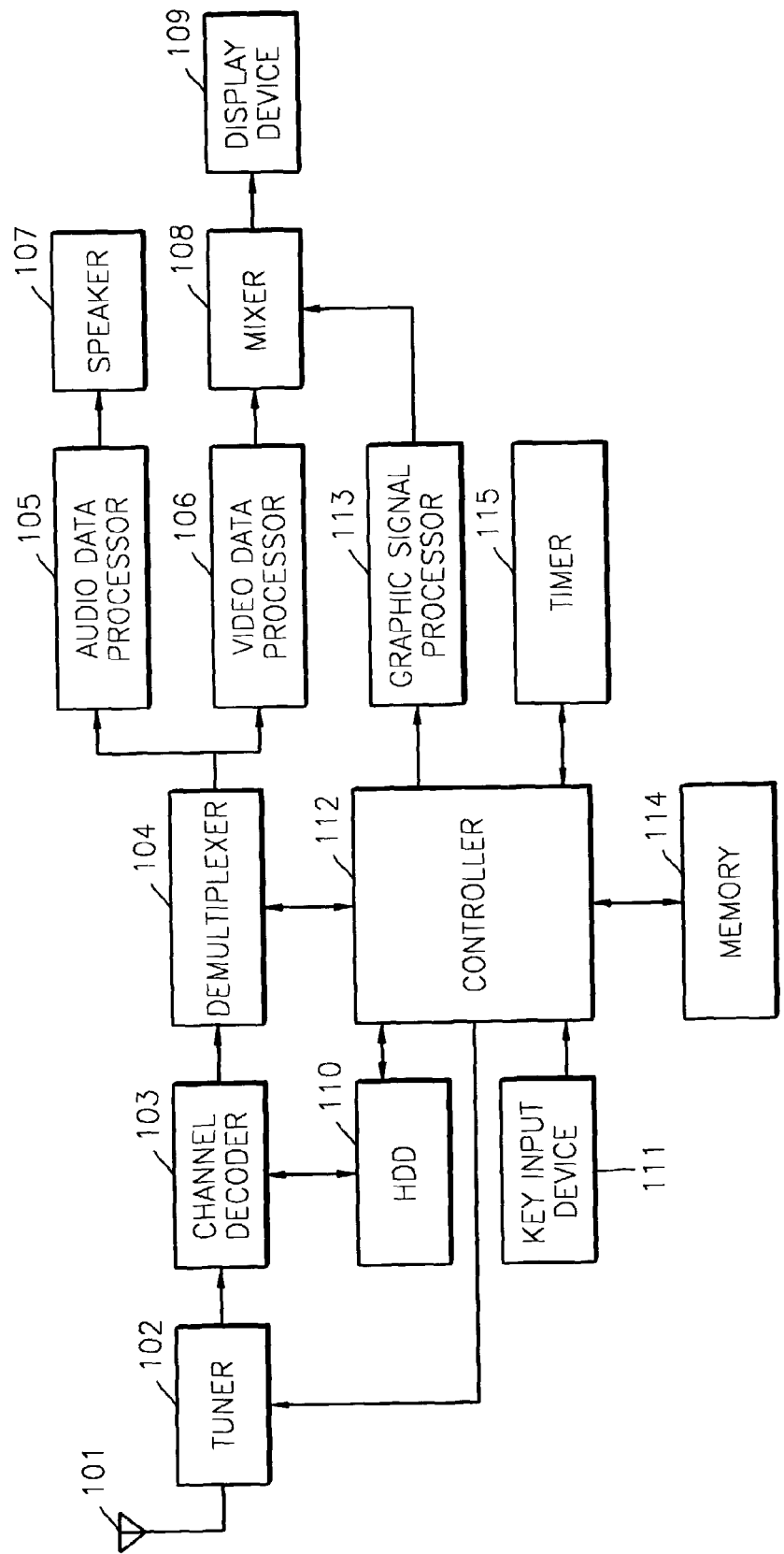
FIG. 1 is a block diagram of an apparatus for managing a list of recorded broadcasting programs according to the present invention.

Referring to FIG. 1, an apparatus for managing a list of recorded broadcasting programs according to the present invention includes an antenna 101, a tuner 102, a channel decoder 103, a demultiplexer 104, an audio data processor 105, a video data processor 106, a speaker 107, a mixer 108, a display device 109, a hard disc drive (HDD) 110, a key input device 111, a controller 112, a graphic signal processor 113, a memory 114, and a timer 115.

The apparatus shown in FIG. 1 basically operates as follows. When a TV is powered on and a channel is selected using keys of the key input device 111, the tuner 102 receives a channel control signal from the controller 112, and in accordance with the channel control signal, selects such broadcasting signals that correspond to the selected channel from broadcasting signals received through the antenna 101. The selected broadcasting signals are output to the channel decoder 103. Then, the channel decoder 103 recovers digital signals detected from the selected broadcasting signals in the unit of packets and outputs the recovered digital broadcasting signals to the demultiplexer 104. The demultiplexer 104 separates audio data, video data, and additional information data from the recovered digital broadcasting signals and outputs the separated audio, video, and additional information data in different bitstreams.

The separated audio data is decoded and converted to analog signals through the audio data processor 105, and the converted analog audio signals are ultimately output through the speaker 107.

Meanwhile, the separated video data is decoded and is subject to signal processing such as error corrections through the video data processor 106. The decoded video data is mixed with graphic signals produced from the graphic signal processor 113 via the mixer 108, and the mixed signals are ultimately output via the display device 109.

The additional information data separated by the demultiplexer 104 includes electronic program guide (EPG) information. The EPG information input to the controller 112 is stored in the memory 114 under the control of the controller 112.

The timer 115 generates time information. The HDD 110 receives from the channel decoder 103 and stores the audio and video data of a broadcasting program selected by a user in a normal or a reserved recording mode and outputs reproduced audio and video data of a recorded broadcasting program to the channel decoder 103 in a reproduction mode.

The HDD 111 includes a file allocation table (FAT) in which information regarding the broadcasting programs is recorded on the HDD 111. A method of managing the FAT in a normal or a reserved recording mode will now be described with reference to FIG. 2 together with FIG. 1.

The controller 112 determines whether a recording start instruction to start normal or reserved recording operations is generated in accordance with a corresponding key value input through the key input device 111 (STEP 210).

In accordance with the recording start instruction received in STEP 210, audio and video data of a selected broadcasting program is stored at unrecorded locations of the HDD 110 and information on the present time corresponding to the starting time for recording is detected from the timer 115 (STEP 220).

Thereafter, the controller 112 determines whether a recording stop instruction to terminate the normal or the reserved recording operations is received in accordance with a corresponding key value input through the key input device 111 (STEP 230).

If the recording stop instruction is received in STEP 230, the corresponding recoding operations are disabled in the HDD 110 and information on the present time that corresponds to the ending time for recording is detected from the timer 115 (STEP 240).

Thereafter, the controller 112 extracts information on the broadcasting programs recorded between the starting time and the ending time for recording from EPG information stored in the memory 114 (STEP 250).

Thereafter, the controller 112 analyzes the information extracted in STEP 250 in terms of titles, recorded time, and recorded locations of the recorded broadcasting programs and updates the FAT of the HDD 110 with the analyzed information (STEP 260).

When a recorded program list menu is called for later after the recording of the broadcasting programs, the controller 112 performs a control process to display recorded program lists specified as shown in FIGS. 3 and 4 using the FAT produced in accordance with the flowchart of FIG. 2.

That is, when a program list display mode is selected, the controller 112 reads information required for an upper level program list menu from the FAT of the HDD 110, and the read information data is processed through the graphic signal processor 113 and displayed on a screen as shown in FIG. 3. Referring to FIG. 3, the upper level program list menu includes the number of detailed lists of the recorded programs, titles of programs corresponding to starting times of recordings, and total recording time information of each recording.

Accordingly, the upper level program list menu shown in FIG. 3 indicates that, for example, broadcasting programs starting with PROGRAM 1 are recorded for 100 minutes and are stored in the first recorded program list. However, a user is not able to know whether the first program list includes only PROGRAM 1 or multiple programs in addition to PROGRAM 1 from the upper level program list menu shown in FIG. 3.

Figure 2:
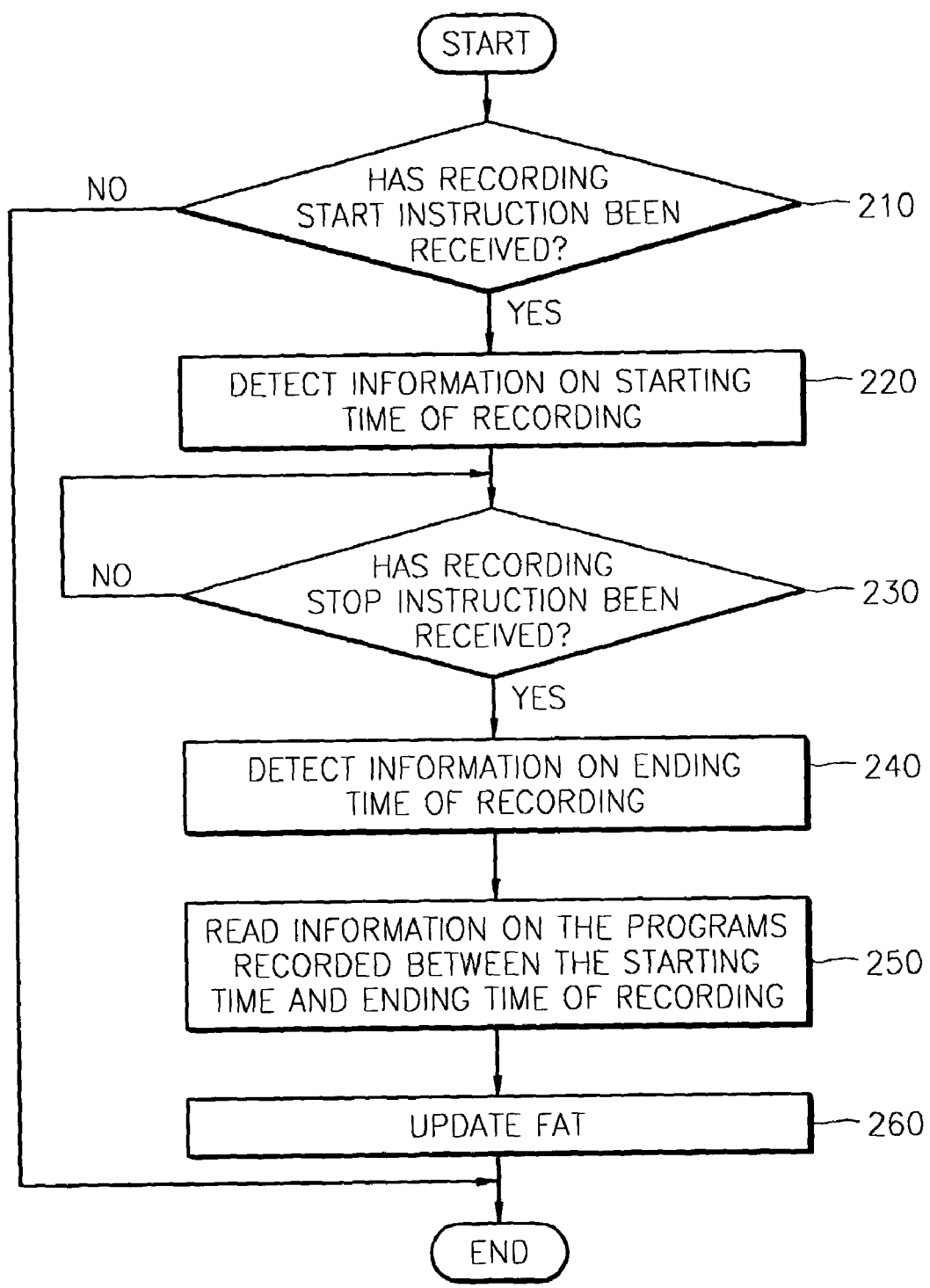
FIG. 2 is a flowchart of a method of managing a list of recorded broadcasting programs according to the present invention.

To solve this problem, a detailed list menu as shown in FIG. 4 is provided using the FAT produced in accordance with the flowchart of FIG. 2. That is, when a detailed display mode is selected in the upper level program list menu, the controller 112 performs a control process to display a detailed list of the programs included in the selected upper level program by matching titles and recording time periods of the detailed programs.

For example, when a user selects the detailed display mode after selecting PROGRAM 1 in the upper level program list menu using an up or down cursor key of the key input device 111, the controller 112 reads information on the titles and the recording time periods of the detailed programs recorded together with PROGRAM 1 for 100 minutes from the FAT stored in the HDD 110, and the read information data is processed through the graphic signal processor 113 and displayed on the screen as shown in FIG. 4.

Referring to FIG. 4, the detailed program list menu indicates that PROGRAM 1 recorded for 100 minutes includes PROGRAM A recorded for 10 minutes, PROGRAM B for 20 minutes, PROGRAM C for 10 minutes, PROGRAM D for 10 minutes, PROGRAM E for 30 minutes, and PROGRAM F for 20 minutes. In this case, the title of PROGRAM 1 is the same as that of PROGRAM A.

If an edit mode is selected for a program, e.g., PROGRAM B, among the detailed programs displayed as shown in FIG. 4, the controller 112 moves the selected PROGRAM B to the nearest unrecorded location of the HDD and deletes the title of PROGRAM B from the detailed list shown in FIG. 4. After editing PROGRAM B, the edited PROGRAM B can be added via the upper level program list menu. If a delete mode is selected, the selected program is erased from the HDD 110 and the corresponding information is deleted from the FAT of the HDD 110. Further, when a play or reproduction mode is selected, the controller 112 traces the location where the selected program is stored and reproduces the selected program. Accordingly, it is possible to access directly and to edit each and every detailed program recorded on a HDD together with a main program.

As described above, according to the present invention, a detailed list of recorded broadcasting programs together with a main program is automatically produced using EPG information. Therefore, it is possible to manage effectively each and every program recorded with the main program and access and edit the respective recorded programs.

The present invention can be implemented on a recording unit with a code that is readable by a computer. The recording unit that can be read by a computer may include any kind of recording devices in which data that is readable by the computer is stored. Examples of the recording unit include ROM, RAM, CD-ROM, magnetic tape, hard discs, floppy discs, flash memory, optical data storage devices, and even carrier waves, for example, transmission over the Internet. Moreover, the recording unit may be distributed among computer systems that are interconnected through a network, and the present invention may be stored and implemented as a code in the distributed system.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A method of managing a list of recorded broadcasting TV programs, comprising:
   (a) detecting information on a starting time and an ending time of recording, when a recording mode is enabled;
   (b) extracting information on a plurality of TV programs sequentially included between the starting time and the corresponding ending time of the single pair from electronic program guide (EPG) information;
   (c) storing the information extracted in operation (b) in a file allocation table (FAT), the stored information to be matched with information on recording time and locations of the corresponding plurality of the TV programs sequentially recorded in a recording unit;
   (d) displaying an upper level list indicating titles and total recording times of the plurality of the programs corresponding to starting times of recording modes, when an upper level menu is selected; and
   (e) when a detailed menu is selected from the upper level menu, displaying a detailed list indicating titles and recording times of sub programs recorded in connection with a selected program among the plurality of the programs.

2. The method of claim 1, wherein the detailed list further indicates a total recorded time of each sub program.

3. An apparatus configured to manage a list of recorded broadcasting programs, comprising:
   a broadcasting signal receiving unit configured to select and to demodulate, in accordance with a channel control signal, only such broadcasting signals that correspond to a selected channel from received broadcasting signals;
   a memory configured to store electronic program guide (EPG) information separated from the broadcasting signals received through the broadcasting signal receiving unit;
   a recording unit configured to store the selected broadcasting signals in a recording mode; and
   a controller configured to extract information on a plurality of TV programs sequentially included between a single pair of a starting time and a corresponding ending time of the stored broadcasting signals from the EPG information, and to store the extracted information in a file allocation table (FAT) to be matched with information on the recording time periods and locations of the corresponding plurality of the TV programs sequentially recorded in the recording unit,
   wherein the controller is further configured to display an upper level list indicating titles and total recording times of the plurality of the TV programs corresponding to starting times of recording modes, when an upper level menu is selected, and when a detailed menu is selected in the upper level menu, to display a detailed list indicating titles and recording times of sub programs recorded in connection with a selected TV program among the plurality of the TV programs.

4. The apparatus of claim 3, wherein the detailed list further indicates a total recorded time period of each sub program.

5. The apparatus of claim 3, wherein the controller is further configured to select a detailed TV program in the detailed menu, moving the selected detailed TV program to the nearest unrecorded address on the recording unit when an editing mode is enabled, and to add information on the detailed TV program selected in the editing mode in the upper level list.

6. The apparatus of claim 3, wherein the recording unit is a hard disc drive.

7. A method of managing a plurality of recorded TV programs, the method comprising:
   receiving, for a single recording session that includes a plurality of TV programs, a recording start instruction to start the single recording session and a recording stop instruction to stop the single recording instruction, wherein the plurality of the TV programs are sequentially included between the received recording start instruction and the received recording stop instruction;
   sequentially recording, based on the received recording start instruction and the received recording stop instruction, the plurality of the TV programs on a recording unit;
   determining, based on the received recording start instruction and the received recording stop instruction, a recording start time of the single recording session and a recording end time of the single recording session, respectively;
   extracting, based on the determined recording start time and the recording end time, respective program information of each of the plurality of the TV programs using electronic program guide (EPG) information; and
   matching the extracted respective program information of each of the plurality of the TV programs with respective locations of the sequentially recorded plurality of the TV programs on the recording unit.

8. An apparatus for managing a plurality of recorded TV programs, the apparatus comprising:
   a reception unit which receives, for a single recording session that includes a plurality of TV programs, a recording start instruction to start the single recording session and a recording stop instruction to stop the single recording instruction, wherein the plurality of the TV programs are sequentially included between the received recording start instruction and the received recording stop instruction;
a recording unit which sequentially records, based on the received recording start instruction and the received recording stop instruction, the plurality of the TV programs on a recording unit; and
a control unit which determines, based on the received recording start instruction and the received recording stop instruction, a recording start time of the single recording session and a recording end time of the single recording session, respectively, which extracts, based on the determined recording start time and the recording end time, respective program information of each of the plurality of the TV programs using electronic program guide (EPG) information, and which matches the extracted respective program information of each of the plurality of the TV programs with respective locations of the sequentially recorded plurality of the TV programs on the recording unit.

* * * * *